Figure 1:
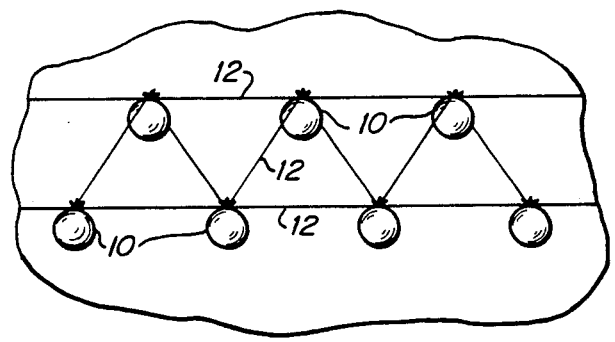

United States Patent [19]

Robbins et al.

[11] Patent Number: 4,493,653
[45] Date of Patent: Jan. 15, 1985

[54] BIOPSIABLE ULTRASOUND PHANTOM

[75] Inventors: Cheston W. Robbins, Englewood, Colo.; Robert M. Kelly, Mountain View, Calif.

[73] Assignee: Technicare Corporation, Solon, Ohio

[21] Appl. No.: 536,419

[22] Filed: Sep. 27, 1983

[51] Int. Cl.³ .................................................. G09B 23/28
[52] U.S. Cl. .............................. 434/262; 128/660; 434/218
[58] Field of Search .............. 128/24 A, 660; 434/218, 434/262, 267, 300; 73/620

[56] References Cited

U.S. PATENT DOCUMENTS

| | | | |
|---|---|---|---|
| 3,310,885 | 3/1967 | Alderson | 434/267 |
| 3,320,685 | 5/1967 | Meiners | 434/300 |
| 4,134,218 | 1/1979 | Adams | 434/267 |
| 4,268,168 | 8/1981 | Carr | 434/218 X |

FOREIGN PATENT DOCUMENTS

| | | | |
|---|---|---|---|
| 2911354 | 2/1980 | Fed. Rep. of Germany | 128/660 |
| 243743 | 7/1969 | U.S.S.R. | 434/218 |
| 402070 | 4/1974 | U.S.S.R. | 434/218 |

OTHER PUBLICATIONS

Ernest L. Madsen et al., "An Anthropomorphic Torso Section Phantom for Ultrasonic Imaging", pp. 43-50 of Jan./Feb. 1980 Med. Phys.

Primary Examiner—Harland S. Skogquist
Attorney, Agent, or Firm—W. Brinton Yorks, Jr.

[57] ABSTRACT

An ultrasound phantom is provided which simulates human tissue containing tissue masses viable for biopsy. The phantom is used to demonstrate or teach the performance of a biopsy procedure assisted by real-time ultrasonic imaging. The phantom comprises a plurality of small balloons, filled with a viscous substance, and tied shut. The balloons are distributed through and surrounded by a gelatinous substance comprising tissue equivalent material. During a simulated biopsy procedure, a section of the phantom is imaged as a biopsy needle penetrates through the tissue equivalent material, pierces one of the balloons, and aspirates some of the viscous substance from the balloon.

12 Claims, 2 Drawing Figures

BIOPSIABLE ULTRASOUND PHANTOM

This invention relates to phantoms used for experimental testing and alignment of ultrasonic imaging systems and, in particular, to ultrasonic phantoms simulating tissue structures upon which biopsy procedures may be performed.

Biopsy is the process of removing tissue from living patients for diagnostic examination. The tissue specimen is typically obtained by aspiration, in which the specimen is removed by aspirating it through a hypodermic needle or trocar that is pierced through the skin or external surface of an organ and into the underlying tissue which is to be sampled.

In some instances such as the case of ovarian and other pelvic neoplasm in which the patient is not a good candidate for surgery, or in whom the neoplasm is felt to be unresectable and tissue diagnosis is needed to plan the optimum therapeutic regimen, ultrasonic imaging can be used to direct a biopsy of the tissue mass. One way to ultrasonically guide the biopsy or aspiration of a mass is by scanning the area in question with ultrasonic imaging apparatus, localizing on the patient's skin the site for puncture, and ascertaining from the ultrasonic images the optimum depth of puncture and the angle of needle inclination. Once the aspiration path has been determined, real-time ultrasonic imaging may be employed during the biopsy procedure itself, enabling the physician to view the needle as it is being inserted through the skin and into the mass for aspiration. Specialized ultrasound equipment is available for performing this type of procedure, such as the sector scanner with biopsy needle guide described in U.S. Pat. No. 4,402,324, entitled "BIOPSY NEEDLE GUIDE FOR SECTOR SCANNER."

It is of course desirable that the biopsy procedure be performed with both care and precision, to ensure the health and safety of the patient. However, skill in performing the procedure generally is acquired through experience, gained by actually performing the procedure. It would therefore be desirable for physicians to have a training aid, which closely parallels surgical conditions. The training aid should provide a substance which physically resembles the tissue and mass substance of the human body. In addition, the aid should acoustically resemble tissue and mass substances, so that the images produced during training closely resemble the images that the physician will be viewing when performing the actual biopsy procedure.

In accordance with the principles of the present invention, an ultrasound phantom is provided for demonstrating and training medical personnel in biopsy procedures. The phantom includes at least one body which mimics a cyst, tumor or other mass viable for aspiration, and is suitable for being aspirated with a biopsy needle. The body also exhibits acoustic properties enabling it to resemble a tissue mass when viewed by ultrasonic imaging. The body is suspended in a substance through which the biopsy needle is inserted to reach the body, and which acoustically represents human tissue.

IN THE DRAWINGS

Figure 2:
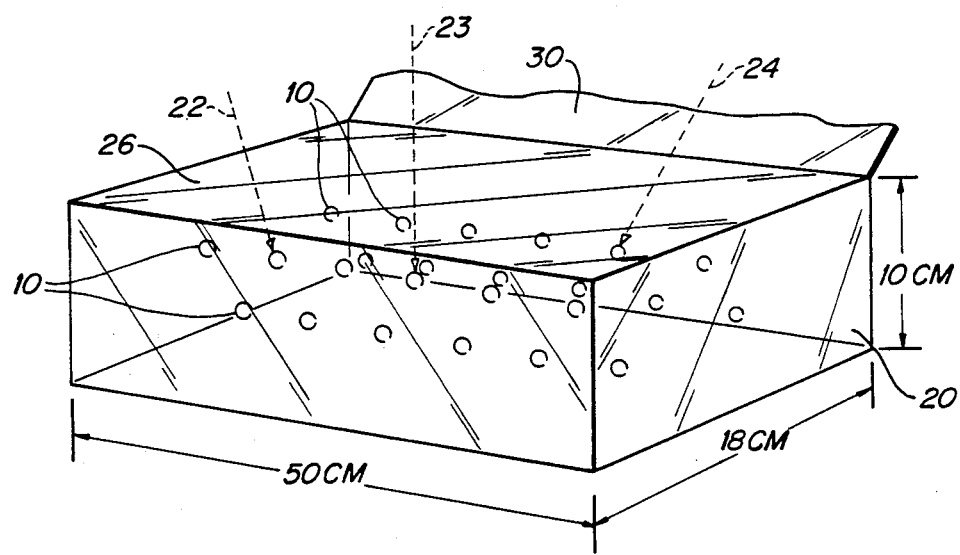

FIG. 1 represents a number of bodies representing cysts which are suspended by threads for a phantom constructed in accordance with the principles of the present invention; and FIG. 2 illustrates a biopsiable phantom constructed in accordance with the principles of the present invention.

Referring to FIGS. 1 and 2, a biopsiable phantom constructed in accordance with the principle of the present invention is shown. The preferred embodiment there shown includes a plurality of anechoic spheres which functionally and acoustically emulate cysts or tumors viable for aspiration. FIG. 1 illustrates a plurality of spheres 10 suspended by nylon threads 12. Each sphere is formed of a latex fingercot with a one-half to one mil wall thickness. Fingercots with greater wall thicknesses have been found to produce ultrasonic reverberations during ultrasonic imaging. The fingercots are filled with substances so that the resultant spheres have diameters ranging from approximately one-half to two and one-half centimeters, thereby representing cysts and tumors of differing sizes. These little balloons are filled with a viscous fluid which is aspirated during use of the phantom, and are tied shut with nylon threads.

For emulation of simple cysts, the balloons are filled with degassed water. Water-filled balloons appear as black discs in the ultrasound image. To imitate cysts with internal structure the fingercots are filled with an emulsion material, such as methacellulose and water. These structures appear as matted grey discs in the ultrasound image. The present inventors have found that this emulsion material does not quickly leak out of a sphere which has been aspirated once or twice, and that the same sphere can be aspirated several times. Spheres are also constructed to resemble tumors by filling the balloons with castor oil and castor wax, which physically looks like reddish clay. These spheres appear as dark discs with shadowy trails beneath them in the ultrasound image. Cysts within cysts have been constructed by placing a smaller sphere within a larger one.

After a number of balloons have been filled and tied shut, they are arranged in a matrix configuration, suspended by nylon threads 12 as shown in FIG. 1. The suspending threads are triangulated as shown to provide greater support for the spheres. The suspended spheres are then hung in a plastic box, which acts as a mold for the phantom. About fifty spheres are hung in the matrix which is stretched across the box, and are typically located in rows located approximately 2 cm., 5 cm., and 8 cm. above the bottom of the box, respectively, as shown in FIG. 2. Typical box dimensions in constructed embodiments of the present invention are 10 cm. high, 50 cm. long, and 18 cm. wide.

The mold with the suspended matrix of spheres is then filled with an ambiance of tissue equivalent material. The material is formed by preparing a 10% concentration of methocel in water. The velocity of ultrasound through material made with this mixture was found to be approximately 1500 meters per second, which is close to that of human tissue. This velocity may be adjusted by varying the proportion of methocel in the mixture. The material was also found to exhibit a density of 1.1 grams per cubic centimeter, and an acoustic attenuation of about 0.6 dB per centimeter per MHz. This attenuation was chosen so that the biopsy needle would show up clearly in the ultrasound image. The attenuation may be varied by adding different proportions of scattering substances, as discussed below. The phantom constructed in this manner was found to closely approximate the acoustic properties of human tissue.

Several other substances may be added to the methocel and water mixture to cause some scattering of ultrsonic waves, in the same manner as the scattering which is characteristic of human tissue. Epoxy powder and nylon particles of sizes ranging from ten to sixty microns were tried. In the case of epoxy powder, a mixture was prepared using 30 grams of epoxy powder, 300 grams of methocel, 2670 grams of water and 5 drops of H-10 surfactant. The addition of the surfactant maintains the epoxy power in suspension in the mixture.

To form the tissue equivalent material using an epoxy scattering agent, methocel is added to water at a temperature of about 150°-160° F. Rapid mixing is performed to quickly disperse the methocel. After about two minutes of mixing, the epoxy powder and surfactant are blended into the mixture. When the mixture takes on a homogeneous appearance, it is allowed to cool as mixing continues until the temperature of the mixture drops to about 145° F. At this temperature the mixture begins to thicken, taking on the consistency of mineral oil. The mixture is then immediately poured into the mold and allowed to set. If the mixture is not immediately poured into the mold while hot, it will "fold" into the mold, forming undesired strata which image as different layers of grey in the ultrasound image.

After the tissue equivalent material 20 has cooled and set, the finished phantom appears as shown in FIG. 2. The mold is not shown in the Figure for ease of illustration. In use, an ultrasonic imaging scanner is placed against the top surface 26 of the phantom and a selected sphere is imaged. The user then inserts a biopsy needle through the surface 26 of the phantom and into a selected, imaged "cyst" or "tumor." Typical insertion paths are indicated by broken arrows 22, 23 and 24. The user guides the needle using the ultrasound image so that it pierces the cyst or tumor and a portion of the substance within the mass is aspirated through the needle.

When not in use, the phantom in its mold is covered by a plastic sheet 30 of 2 mil thick polyether based urethane film or 1.5 mil thick ethyl methacrolate film. The ethyl methacrolate film is preferred because it has a lower permeability to water which extends the life of the phantom by inhibiting its tendency to dry out. When evaporation is allowed to occur, the tissue equivalent material will begin to harden. If such crusting occurs, tap water may be added to soften the material and restore it to its desired condition.

What is claimed is:

1. A phantom for ultrasonic imaging and suitable for simulating a biopsy procedure comprising:

a main structure of tissue equivalent material which exhibits acoustic properties resembling those of human tissue, and through which a biopsy needle may be inserted and ultrasonically imaged during a simulated biopsy procedure; and at least one relatively smaller body, suspended within said main structure of tissue equivalent material, and formed of an outer casing containing a substance which may be aspirated during a simulated biopsy procedure, said body representing a tissue mass viable for biopsy and exhibiting acoustic properties resembling those of such a tissue mass during ultrasonic imaging.

2. The phantom of claim 1, wherein said outer casing of said smaller body is an elastic material and said substance is water.

3. The phantom of claim 1, wherein said outer casing of said smaller body is an elastic material and said substance is an emulsion.

4. The phantom of claim 1, wherein said casing of said smaller body is an elastic material and said substance is castor oil and castor wax.

5. The phantom of claim 1, wherein said smaller body comprises a latex fingercot, filled with said substance, and tied shut.

6. The phantom of claim 1, further comprising a mold; and a plurality of smaller bodies suspended by threads within said mold and surrounded by said tissue equivalent material.

7. The phantom of claim 1, wherein said tissue equivalent material comprises a mixture of methocel and water.

8. The phantom of claim 1, further comprising a particulate material, distributed throughout said tissue equivalent material, and causing scattering of ultrasonic waves directed through said main structure.

9. The phantom of claim 8, wherein said particulate material is epoxy powder.

10. The phantom of claim 8, wherein said particulate material is nylon.

11. The phantom of claim 1, further comprising a sheet of film for covering the surface of said phantom when not in use.

12. An ultrasonic phantom which simulates human tissue and tissue masses comprising:

a mold;

a plurality of spheres suspended within said mold, each sphere comprising a small balloon which contains a viscous material, said spheres representing tissue masses; and a gelatinous substance, located within said mold and surrounding said spheres, said substance representing human tissue.

* * * * *